(12) United States Patent
Matsuo et al.

(10) Patent No.: US 9,624,819 B2
(45) Date of Patent: Apr. 18, 2017

(54) RADIATOR ARRANGEMENT STRUCTURE FOR SADDLE-RIDE TYPE VEHICLES

(71) Applicant: HONDA MOTOR CO., LTD., Tokyo (JP)

(72) Inventors: Hisashi Matsuo, Wako (JP); Konomu Hoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/065,583

(22) Filed: Mar. 9, 2016

(65) Prior Publication Data

US 2016/0273442 A1    Sep. 22, 2016

(30) Foreign Application Priority Data

Mar. 18, 2015    (JP) .................................. 2015-054530

(51) Int. Cl.
| | | |
|---|---|---|
| B60K 11/04 | (2006.01) | |
| B60R 19/52 | (2006.01) | |
| F01P 11/04 | (2006.01) | |
| B62K 11/00 | (2006.01) | |
| B62K 11/04 | (2006.01) | |
| B62M 7/02 | (2006.01) | |
| F01P 1/06 | (2006.01) | |
| F01P 3/20 | (2006.01) | |
| F01P 5/02 | (2006.01) | |

(52) U.S. Cl.
CPC .............. *F01P 11/04* (2013.01); *B60K 11/04* (2013.01); *B62K 11/00* (2013.01); *B62K 11/04* (2013.01); *B62M 7/02* (2013.01); *F01P 1/06* (2013.01); *F01P 3/20* (2013.01); *F01P 5/02* (2013.01)

(58) Field of Classification Search
CPC .......... B60K 11/04; B62K 11/04; B60R 19/52
See application file for complete search history.

(56) References Cited

U.S. PATENT DOCUMENTS

| | | | | |
|---|---|---|---|---|
| 6,695,088 B2* | 2/2004 | Schroeder | ................ | B62J 17/00 180/229 |
| 7,743,868 B2* | 6/2010 | Buell | ..................... | B62K 11/04 180/229 |
| 2006/0076177 A1* | 4/2006 | Arnold | .................. | B62K 11/04 180/219 |

FOREIGN PATENT DOCUMENTS

JP    2009-001264 A    1/2009

* cited by examiner

*Primary Examiner* — Bryan Evans
(74) *Attorney, Agent, or Firm* — Chip Law Group

(57) ABSTRACT

A radiator arrangement structure for a saddle-ride type vehicle places, in a saddle-ride type vehicle equipped with a water-cooled internal combustion engine, a radiator to face a front portion of a rear fender and to incline rearward along the rear fender, and a cooling fan in front of the radiator in a forward inclined position. Alternatively or additionally, in the radiator arrangement structure for a saddle-ride type vehicle, in side view, the cooling fan and the radiator are housed in a V-shaped region defined by a main frame and the rear fender in such a manner as to increase a distance between the cooling fan and the radiator toward their top ends.

8 Claims, 3 Drawing Sheets

RADIATOR ARRANGEMENT STRUCTURE FOR SADDLE-RIDE TYPE VEHICLES

CROSS REFERENCE TO RELATED APPLICATIONS

This application claims the benefit of Japanese Priority Patent Application JP 2015-054530 filed on Mar. 18, 2015, the entire contents of which are incorporated herein by reference.

TECHNICAL FIELD

The present application relates to a radiator arrangement structure of a saddle-ride type vehicle.

BACKGROUND ART

Some saddle-ride type vehicles have a radiator placed downward of the rider seat and upward of a rear fender, one of which is disclosed in, for example, Patent Literature 1 listed later.

However, in the saddle-ride type vehicle as disclosed in Patent Literature 1, there is a technical problem that placing a radiator in a position perpendicular to a rear fender in side view requires a relatively large mounting space below the rider seat, in turn requiring a higher seat height.

There are also technical problems that the effective area of the radiator core is reduced because a cooling fan is located next to the rearward end of the radiator, and further the size of an exhaust duct is increased in order to protect the cooling fan from outside foreign substances such as flying substances thrown up by the rear wheel and/or the like.

CITATION LIST

Patent Literature

[Patent Literature 1] JP-A No. 2009-001264 (FIG. 1, FIG. 2)

SUMMARY OF APPLICATION

In light of the above-described related art, an object of the present application is to provide a radiator arrangement structure of a saddle-ride type vehicle that enables a compact mounting space, a reduction in seat height and an enhancement in cooling performance.

The present application has been made in light of the above-descried related art, and provides a radiator arrangement structure of a saddle-ride type vehicle equipped with a water-cooled internal combustion engine. In the saddle-ride type vehicle, a radiator is placed to face a front portion of a rear fender and to incline rearward along the rear fender; and a cooling fan is placed forward of the radiator in a forward inclined position.

A feature of the embodiments described in claim 2 is that, in the radiator arrangement structure for a saddle-ride type vehicle according to claim 1, in side view, the cooling fan and the radiator are housed in a V-shaped region defined by a main frame and the rear fender, in such a manner as to increase a distance between the cooling fan and the radiator toward their top ends.

A feature of the embodiments described in claim 3 is that, in the radiator arrangement structure for a saddle-ride type vehicle according to claim 2, the radiator is placed directly underneath a rider seat.

A feature of the embodiments described in claim 4 is that, in the radiator arrangement structure for a saddle-ride type vehicle according to claim 2 or 3, the cooling fan is placed directly underneath a rider seat and covered with a body cover.

A feature of the embodiments described in claim 5 is that, in the radiator arrangement structure for a saddle-ride type vehicle according to claim 4, a fan shroud surrounding the cooling fan has a vent inclined forward.

A feature of the embodiments described in claim 6 is that, in the radiator arrangement structure for a saddle-ride type vehicle according to any one of claims 3 to 4, a part of the radiator extends upward beyond seat rails in side view.

With the radiator arrangement structure for a saddle-ride type vehicle according to the embodiments described in claim 1, the radiator is placed to incline rearward along the front portion of the rear fender, and the cooling fan is placed forward of the radiator to incline forward. Because of this, the cooling fan and the radiator are located to increase the space between them gradually toward their top ends.

As a result, the size in the height direction of the radiator and the cooling fan is reduced to achieve compact layout. Further, placing the cooling fan in an inclined position relative to the radiator causes cooling air to readily hit the entire radiator core, leading to enhancement in cooling performance.

Further, because the cooling fan is placed in front of the radiator, the cooling fan is located at a distance from the rear wheel in the forward direction. Therefore, as compared with the case of the cooling fan being arranged rearward of the radiator, the cooling fan can be located to prevent easy entry of foreign substances from outside.

According to the embodiments described in claim 2, in addition to the advantageous effects of application according to claim 1, the rider seat is placed above the V-shaped region, so that room under the rider seat is adequate to house components arranged therein to be spaced gradually from each other toward their tops. Therefore, the cooling fan and the radiator can be arranged in a compact manner under the rider seat.

According to the embodiments described in claim 3, in addition to the advantageous effects of application according to claim 2, because the radiator is inclined rearward along the rear fender, the vertical installed height of the radiator can be reduced. This minimizes the projection of the radiator from the seat reals, enabling a reduction in height of the rider seat.

According to the embodiments described in claim 4, in addition to the advantageous effects of application according to claim 2 or 3, because the cooling fan is placed in a space which is under the rider seat and is easily covered with the body cover, this makes the cooling fan difficult to be recognized visually from outside, contributing to the protected cooling fan and the aesthetic appearance of the vehicle.

According to the embodiments described in claim 5, in addition to the advantageous effects of application according to claim 4, when the rider seat is removed, because the vent of the fan shroud is sloped forward, foreign substances are made difficult to enter the vent of the fan shroud from the outside, and foreign substances can be easily removed from the bottom of the fan shroud.

According to the embodiments described in claim 6, in addition to the advantageous effects of application according to any one of claims 3 to 5, it is made possible that the radiator is positioned to incline rearward to minimize the height of the rider seat, and additionally, the radiator core ranges between the seat rails to increase the cooling area of the radiator core.

DETAILED DESCRIPTION

Figure 1:
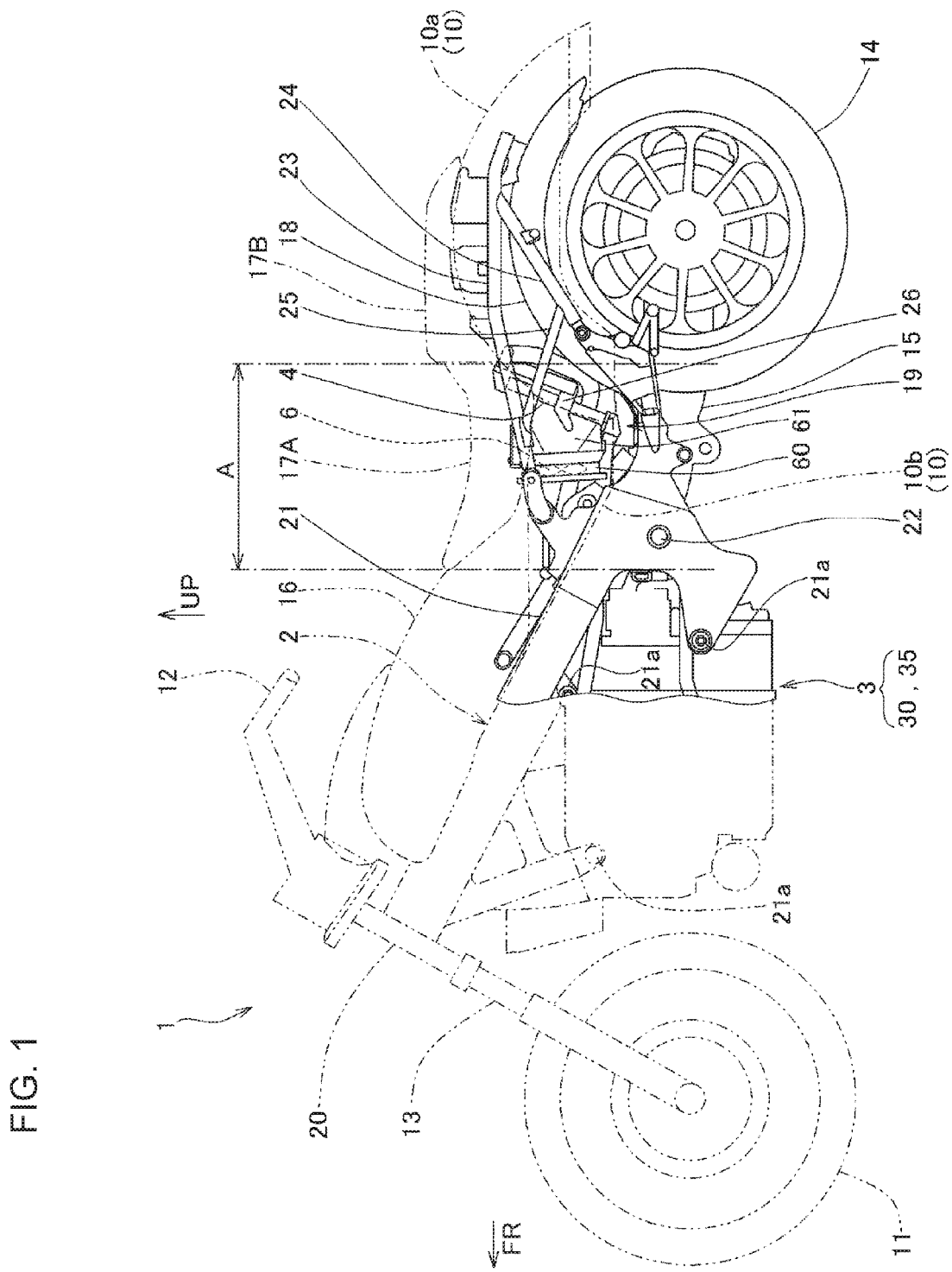
FIG. 1 is a left side view of an essential part of a motorcycle having a radiator arrangement structure of a saddle-ride type vehicle according to one embodiment of the present application.

A radiator arrangement structure of a saddle-ride type vehicle according to one embodiment of the present application is described with reference to FIG. 1 to FIG. 3.

Directions such as front, rear, left, right, upper, down and the like described in the claims and the specification are used based on the orientation of a vehicle having the radiator arrangement structure of the saddle-ride type vehicle according to the embodiment. The vehicle in the embodiment is a saddle-ride type vehicle, in particular, a motorcycle.

In the drawings, arrow FR shows a forward direction of the vehicle, arrow LH shows a leftward direction of the vehicle, arrow RH shows a rightward diction of the vehicle and arrow UP shows an upward direction of the vehicle.

FIG. 1 is a left side view of an essential part of a motorcycle having the radiator arrangement structure of the saddle-ride type vehicle according to one embodiment of the present application.

FIG. 1 illustrates a motorcycle ("saddle-ride type vehicle" in the present application) 1, in which a body cover 10 is indicated simply by a two-dot chain line with some parts omitted, and also the front section of the vehicle, a power unit 3, and the like are simply indicated by two-dot chain lines, and only essential parts of the rear section of the vehicle are shown.

As illustrated in FIG. 1, a body frame 2 of the motorcycle 1 includes a main frame 21 extending from an upper front point of the vehicle body toward a rearward and downward direction, and a front fork 13 with a lower end to which a front wheel 11 is journaled and an upper end to which a handlebar 12 is secured is steerably supported by a head pipe 20 that is attached to a front end of the main frame 21.

The power unit 3 driving a rear wheel 14 is placed in a space under the main frame 21. The power unit 3 is mounted to the main frame 21 through a plurality of hanger members 21a.

Further, a front end of a swing arm 15, which pivotally supports the rear wheel 14 at the rear end, is pivotally supported through a pivot shaft 22 by a rear end of the main frame 21 in a vertically swingable manner. The power unit 3 includes a water-cooled internal combustion engine 30 and a transmission 35, and has an output shaft connected to the rear wheel 14 through a not-shown drive shaft mounted along the swing arm 15 to transfer the rotational power to the rear wheel 14.

The main frames 21 are provided in a left-right pair and are spread apart in the left-right directions in plain view as extending rearward. Then, a fuel tank 16 is supported to be laid on between the left and right main frames 21. Also, left and right seat rails 23 are provided to extend upwardly toward the rear respectively from upper portions of the rear ends of the left and right main frames 21, and back stays 24 are provided respectively for connection between lower portions of the rear ends of the left and right main frames 21 and rearward portions of the left and right seat rails 23. A rider seat 17A and a pillion passenger seat 17B are mounted on the seat rails 23. Imaginary lines A in FIG. 1 indicate the range and length of the rider seat 17A in the vehicle-longitudinal direction.

Figure 3:
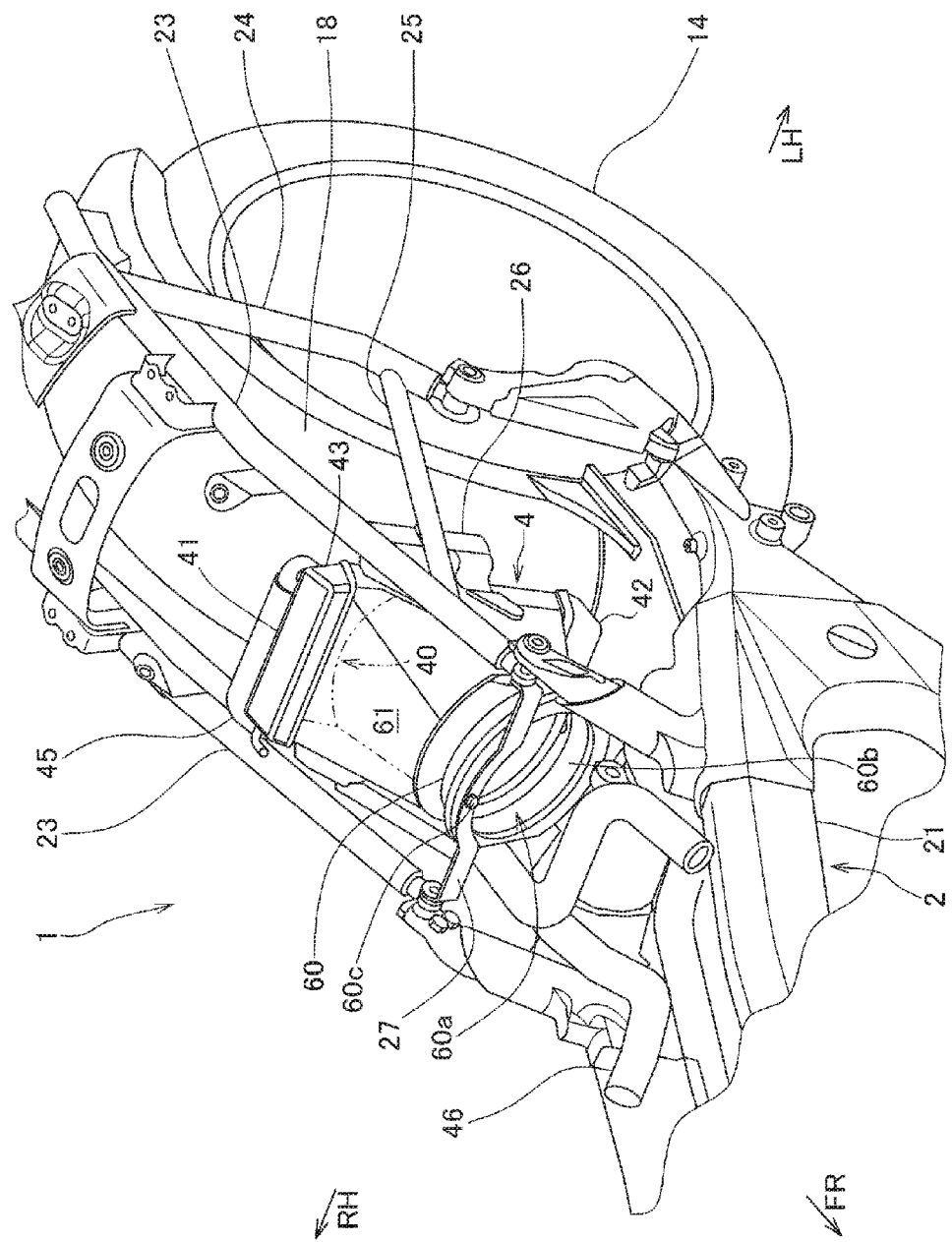
FIG. 3 is a perspective view of the rear half of the motorcycle shown in FIG. 1 as viewed from the front on the upper left side.

The members on either left or right side are connected to each other by connecting members as illustrated in FIG. 3, and a reinforcing frame 25 is placed between a front portion of the seat rail 23 and the back stay 24.

A rear cushion unit, not shown, is placed between an upper portion of the rear end of the main frame 21 and the swing arm 15.

A rear cover 10a of the body cover 10 is mounted downward of a rear portion of the rider seat 17A and pillion passenger seat 17B and above the rear wheel 14 so as to cover the rear portion of the seat rails 23 and the back stays 24. A side cover 10b of the body cover 10 is mounted downward of a front portion of the rider seat 17A so as to cover the front portion of the seat rail 23 and an area downward of the seat rail 23.

On the other hand, a rear fender 18 is attached to the swing arm 15 to cover the upper surface of the rear wheel 14, so that the rear fender 18 vertically swings together with the rear wheel 14.

Figure 2:
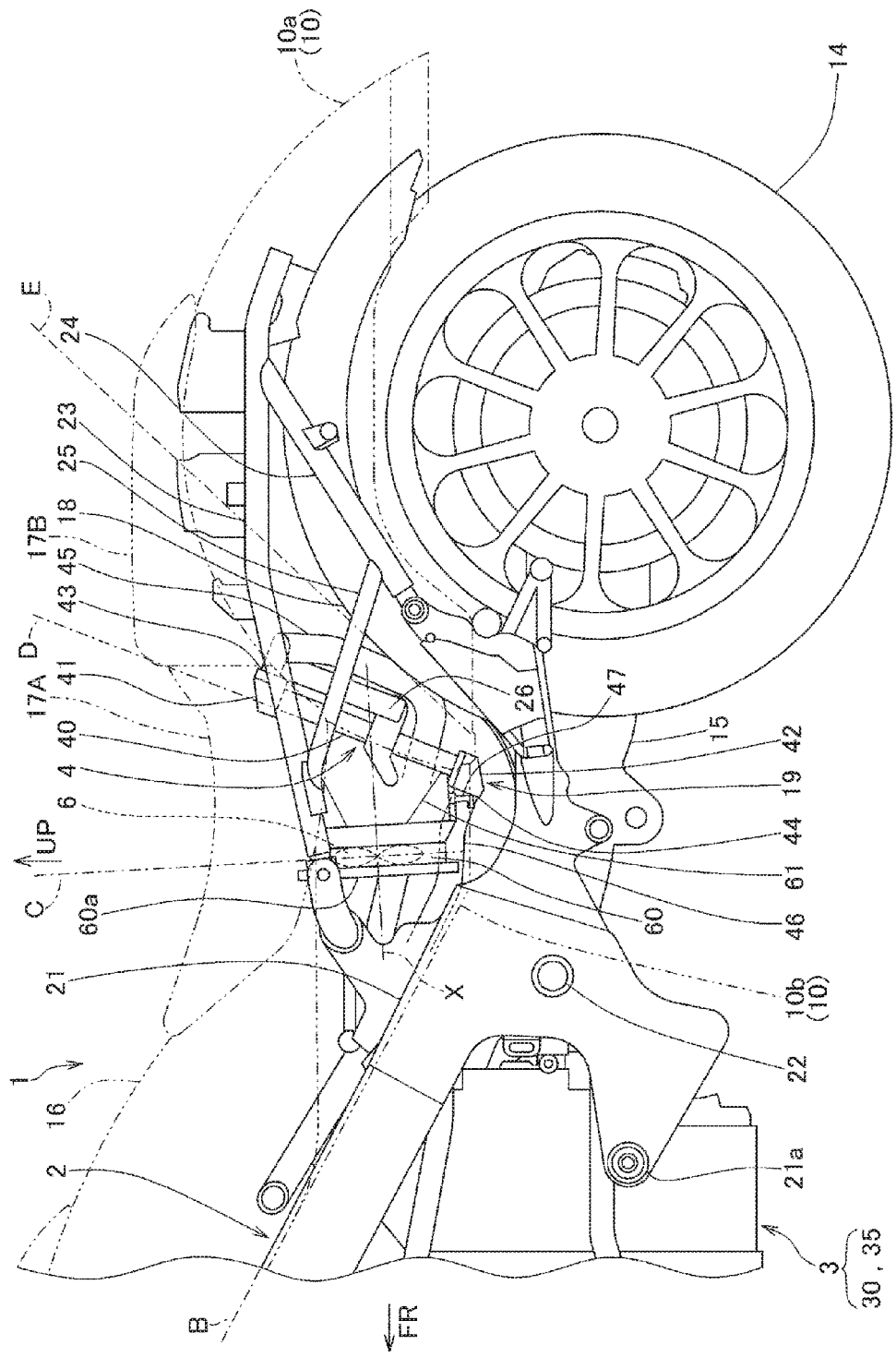
FIG. 2 is an enlarged view of a rear half of the motorcycle shown in FIG. 1.

In the motorcycle 1 in the embodiment, the main frame 21 is oriented downward to the rear as indicated by imaginary line B in FIG. 2, and, in a position rearward of this, a front portion of the rear fender 18 is oriented upward to the rear as indicated by imaginary line E in FIG. 2. Thus, the main frame 21 and the rear fender 18 form a V shape as formed by imaginary lines B and E in side view.

Then, a radiator 4 and a cooling fan 6 for cooling the internal combustion engine 30 are mounted in the V-shaped space in side view.

As illustrated in FIG. 2, the radiator 4 is arranged to incline rearward along the rear fender 18 while facing the front portion of the rear fender 18 as indicated by imaginary line D in FIG. 2. The radiator 4 is mounted to the body frame 2 with a radiator mounting stay 26 which is attached to the seat rails 23 and the reinforcing frames 25 (see FIG. 3).

Regarding the cooling fan 6 as illustrated schematically by a chain line in FIG. 2, in front of the radiator 4, the cooling fan 6 is arranged to incline forward as indicated by imaginary line C in FIG. 2, and a fan shroud 60 surrounding the cooling fan 6 is mounted to the body frame 2 through a fan mounting stay 27 with a fan mounting bolt 60c (see FIG. 3).

A cooling-air duct 61 is connected between the fan shroud 60 and the radiator 4, so that cooling air is delivered to the radiator 4 with reliability.

The radiator 4 cooling the coolant in the internal combustion engine 30 includes an upper tank 41, a lower tank 42, and a rectangular radiator core 40 formed between the upper tank 41 and the lower tank 42. The radiator core 40 includes a plurality of flat coolant tubes, not shown, which connect between the upper tank 41 and the lower tank 42, and a plurality of corrugated fins, not shown, which connect between adjacent coolant tubes. A coolant returning port 44 in the lower tank 42 is connected through a radiator lower hose 46 to the internal combustion engine 30, while a coolant delivery port 43 in the upper tank 41 is connected through a radiator upper hose 45 to the internal combustion engine 30. Incidentally, reference sign 47 in FIG. 2 denotes a drain outlet.

The cooling fan 6 is rotated by a not-shown motor supported at the center of the fan shroud 60, so that, while the air sucked and blown by the cooling fan 6 passes through the radiator 4 from the front side to the rear side, it comes into contact with the cooling fins for heat exchange.

As illustrated in FIG. 2, the radiator 4 is positioned to incline rearward along the front portion of the rear fender 18 as indicated by imaginary line D, while the cooling fan 6 is positioned in front of the radiator 4 to incline forward as indicated by imaginary line C. Thus, the cooling fan 6 and the radiator 4 are arranged such that the distance between them is increased toward their top ends.

As a result, the size in the height direction of the radiator 4 and the cooling fan 6 is reduced to achieve compact layout.

Further, as shown by center line X of the cooling fan 6 indicated by a dot-dash line in FIG. 2 which inclines downward toward the front and diagonally intersects the surface of the radiator 4, the cooling fan 6 is arranged in a forward inclined position and also the cooling fan 6 is placed in an inclined position relative to the radiator 4. As a result, the cooling air hits the radiator core 40 in a slanting diction, so that the range of the radiator core 40 in which the cooling air hits at an effective speed extends in the vertical direction, causing the cooling air to readily hit the entire radiator core 40, leading to enhancement in cooling performance.

Accordingly, the radiator core 40 of the radiator 4 is formed in a vertically elongated shape with dimensions in the vertical direction greater than dimensions in the lateral direction for a reduction in dimensions in the lateral direction of the radiator 4 in order to contribute to a reduced vehicle width.

Further, because the cooling fan 6 is arranged forward of the radiator 4, the cooling fan 6 is located far away from the rear wheel 14 in the forward direction. Therefore, as compared with the case of the cooling fan 6 arranged rearward of the radiator 4, the cooling fan 6 can be located in a position to prevent easy entry of foreign substances, such as flying substances thrown up by the rear wheel 14 and/or the like, into the cooling fan 6 from outside.

Further, in side view, the cooling fan 6 and the radiator 4 are arranged within the V-shaped region 19 defined by the main frame 21 and the rear fender 18 as indicated by imaginary lines B and E such that the space between the cooling fan 6 and the radiator 4 is wider toward their top ends. The rider seat 17A is placed upward of the V-shaped region 19, so that room corresponding to the length in the longitudinal direction A in FIG. 1 under the rider seat 17A is adequate to house components arranged therein to be spaced gradually from each other toward their tops. Therefore, the cooling fan 6 and the radiator 4 can be designed to be arranged in a compact manner under the rider seat 17A.

In particular, in the embodiment, the radiator 4 is placed directly underneath the rider seat 17A within the range with the length in the longitudinal direction A in FIG. 1. In spite of this, because the radiator 4 is inclined rearward along the rear fender 18, a reduction in the vertical installed height of the radiator 4 is achieved. This minimizes the projection of the radiator 4 from the seat rail 23, enabling a reduction in height of the rider seat 17A.

Further, the cooling fan 6 is placed directly underneath the rider seat 17A within the range corresponding to the length in the longitudinal direction A in FIG. 1, but the cooling fan 6, together with the fan shroud 60 and the cooling-air duct 61, is covered with the side cover 10b of the body cover 10.

Because the cooling fan 6 is placed in a space which is under the rider seat 17A and is easily covered with the body cover 10, the cooling fan 6 is not easily recognized visually from outside, contributing to the cooling fan 6 and the aesthetic appearance of the vehicle.

Then, as shown by center line X of the cooling fan 6 indicated with the dot-dash line in FIG. 2, a vent 60a of the fan shroud 60 surrounding the cooling fan 6 is sloped forward. Because of this, when the rider seat 17A is removed for maintenance and/or the like, foreign substances are made difficult to enter the vent 60a of the fan shroud 60 from the outside, and foreign substances can be easily removed from a bottom 60b of the fan shroud 60 (see FIG. 3).

Not that, also, forming openings in the bottom of the cooling-air duct 61 connecting between the fan shroud 60 and the radiator 4 makes it possible to remove the entering foreign substances with ease.

As illustrated in FIG. 2 and FIG. 3, in the embodiment, a part of the radiator 4, specifically, a part of the upper tank 41 in this case, protrudes upward from the seat rails 23 in side view.

Because of this, the radiator 4 is positioned to incline rearward to minimize the height of the rider seat as described earlier, and additionally, the radiator core 40 ranges between the seat rails 23 to increase the cooling area of the radiator core 40, enhancing the cooling performance of the radiator 4.

Up to this point, the radiator arrangement structure of the saddle-ride type vehicle according to one embodiment of the present application has been described, but it will be appreciated that the present application is not limited to the embodiment, and encompasses embodiments carried out in various other forms within the scope of the spirit of the present application.

For example, the saddle-ride type vehicle in the present application includes compact vehicles such as three-wheel buggy as well as the motorcycle in the embodiment. Further, the water-cooled internal combustion engine is not limited by specific types and the number of cylinders.

REFERENCE SIGNS LIST

1 . . . Motorcycle ("Saddle-ride-type vehicle" in the present application)
2 . . . Body frame
3 . . . Power unit
4 . . . Radiator
6 . . . Cooling fan
10 . . . Body cover
10a . . . Rear cover
10b . . . Side cover
14 . . . Rear wheel
15 . . . Swing arm
16 . . . Fuel tank
17A . . . Rider seat
17B . . . Pillion passenger seat
18 . . . Rear fender
19 . . . Region
20 . . . Head pipe
21 . . . Main frame
23 . . . Seat rail
24 . . . Back stay
25 . . . Reinforcing frame
26 . . . Radiator mounting stay
27 . . . Fan mounting stay
30 . . . Internal combustion engine
35 . . . Transmission 40 . . . Radiator core
41 . . . Upper tank
42 . . . Lower tank
60 . . . Fan shroud
60a . . . Vent
60b . . . Bottom
60c . . . Fan mounting bolt
61 . . . Cooling-air duct
X . . . Center line of cooling fan 6

What is claimed is:

1. A radiator arrangement structure for a saddle-ride type vehicle, the saddle-ride type vehicle being equipped with a water-cooled internal combustion engine, wherein:
   a radiator is placed to face a front portion of a rear fender and to incline rearward along the rear fender; and
   a cooling fan is placed forward of the radiator in a forward inclined position, wherein in side view, the cooling fan and the radiator are housed in a V-shaped region defined by a main frame and the rear fender, in such a manner as to increase a distance between the cooling fan and the radiator toward their top ends.

2. The radiator arrangement structure for a saddle-ride type vehicle according to claim 1, wherein the radiator is placed directly underneath a rider seat.

3. The radiator arrangement structure for a saddle-ride type vehicle according to claim 1, wherein the cooling fan is placed directly underneath a rider seat and covered with a body cover.

4. The radiator arrangement structure for a saddle-ride type vehicle according to claim 3, wherein a fan shroud surrounding the cooling fan has a vent inclined forward.

5. The radiator arrangement structure for a saddle-ride type vehicle according to claim 2, wherein a part of the radiator extends upward beyond seat rails in side view.

6. The radiator arrangement structure for a saddle-ride type vehicle according to claim 2, wherein the cooling fan is placed directly underneath the rider seat and covered with a body cover.

7. The radiator arrangement structure for a saddle-ride type vehicle according to claim 3, wherein a part of the radiator extends upward beyond seat rails in side view.

8. The radiator arrangement structure for a saddle-ride type vehicle according to claim 4, wherein a part of the radiator extends upward beyond seat rails in side view.

* * * * *